US010127246B2

(12) United States Patent
McElmurray (10) Patent No.: US 10,127,246 B2
(45) Date of Patent: Nov. 13, 2018

(54) AUTOMATIC GROUPING BASED HANDLING OF SIMILAR PHOTOS

(71) Applicant: MICROSOFT TECHNOLOGY LICENSING, LLC, Redmond, WA (US)

(72) Inventor: John McElmurray, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 143 days.

(21) Appl. No.: 15/237,855

(22) Filed: Aug. 16, 2016

(65) Prior Publication Data

US 2018/0052869 A1 Feb. 22, 2018

(51) Int. Cl.
*G06K 9/62* (2006.01)
*G06F 17/30* (2006.01)

(52) U.S. Cl.
CPC .. *G06F 17/30247* (2013.01); *G06F 17/30265* (2013.01)

(58) Field of Classification Search
CPC .............. G06F 17/30247; G06F 17/30265
See application file for complete search history.

(56) References Cited

U.S. PATENT DOCUMENTS

| 8,639,028 | B2 | 1/2014 | Spaeth et al. |
| 9,363,438 | B2 * | 6/2016 | Ben Israel ......... H04N 5/23277 |
| 2006/0195475 | A1 | 8/2006 | Logan et al. |
| 2007/0070365 | A1 | 3/2007 | Boregowda et al. |
| 2009/0161962 | A1 | 6/2009 | Gallagher et al. |
| 2012/0210200 | A1 * | 8/2012 | Berger ................. G06F 3/0481 715/202 |
| 2013/0091026 | A1 * | 4/2013 | Deng ..................... G06Q 30/02 705/14.73 |
| 2014/0161348 | A1 | 6/2014 | Sutherland et al. |
| 2014/0169644 | A1 | 6/2014 | Dockhorn et al. |
| 2014/0169702 | A1 | 6/2014 | Dockhorn et al. |

(Continued)

FOREIGN PATENT DOCUMENTS

WO 2013160524 A1 10/2013

OTHER PUBLICATIONS

"Aperture 3 User Manual: Creating Stacks", Retrieved on: May 30, 2016 Available at: https://documentation.apple.com/en/aperture/usermanual/index.html#chapter=8%26section=2%26tasks=true.

(Continued)

*Primary Examiner* — Gregory M Desire
(74) *Attorney, Agent, or Firm* — Rainier Patents, P.S.

(57) ABSTRACT

Technologies are described in conjunction with automatic grouping based handling of similar photos. According to some examples, similar photos may be grouped as a group of people or person's image taken within a short time frame. Grouping of the photos may be based on a difference metric comparing facial features, background composition, and color composition. Among the group of photos, a representative image may be selected based on a quality threshold and displayed representing the entire group. Visual aids such as icons, text, and other elements may be used to indicate information associated with the grouped photos. Context based menus may be presented to allow users to select and handle the entire group or photos within the group seamlessly as the user handles other images within a photo viewing/handling user interface.

20 Claims, 8 Drawing Sheets

(56) References Cited

U.S. PATENT DOCUMENTS

| | | |
|---|---|---|
| 2015/0029349 A1 | 1/2015 | Ben et al. |
| 2015/0062103 A1 | 3/2015 | Tatsumi |
| 2015/0071547 A1 | 3/2015 | Keating et al. |
| 2015/0348242 A1 | 12/2015 | Molgaard et al. |
| 2018/0052869 A1* | 2/2018 | McElmurray ..... G06F 17/30265 |

OTHER PUBLICATIONS

Hoffman, Michael, "Automatically Stack Lightroom Images", Published on: Sep. 4, 2012 Available at: http://www.tipsquirrel.com/automatically-stack-lightroom-images/.

* cited by examiner

AUTOMATIC GROUPING BASED HANDLING OF SIMILAR PHOTOS

BACKGROUND

Smartphone or digital camera users may tend to photograph the same subject or scene multiple times in order to capture a perfect shot. While some cameras may have an explicit "burst capture" mode, where many shots may be captured sequentially in a short time frame, users may still prefer tapping a normal shutter button over using this extra mode. However, users typically have to switch to a special mode to capture such photos and then view them. While some grouping features may be provided, processing such as viewing, deleting, moving, etc. of the grouped photos can be a cumbersome endeavor using conventional applications.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to automatic grouping based handling of similar photos. a plurality of photos taken within a predefined period of time or of a similar scene may be received at a photo service. The photo service may analyze the plurality of photos based on a capture time, facial features, a background composition, and a color composition, and group a subset of the plurality of photos as a stack based on applying a threshold to analysis results. The photo service may then select one of the photos in the stack as a representative photo based on a quality threshold, and provide the stack to be displayed in a collapsed format with the representative photo on top using one or more visual indicators associated with the stack.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, embodiments are directed to automatic grouping based handling of similar photos. According to some examples, similar photos may be grouped as a group of people or person's image taken within a short time frame. Grouping of the photos may be based on a difference metric comparing facial features, background composition, and color composition. Among the group of photos, a representative image may be selected based on a quality threshold and displayed representing the entire group. Visual aids such as icons, text, and other elements may be used to indicate information associated with the grouped photos. Context based menus may be presented to allow users to select and handle the entire group or photos within the group seamlessly as the user handles other images within a photo viewing/handling user interface.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for automatic grouping based handling of similar photos.

Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
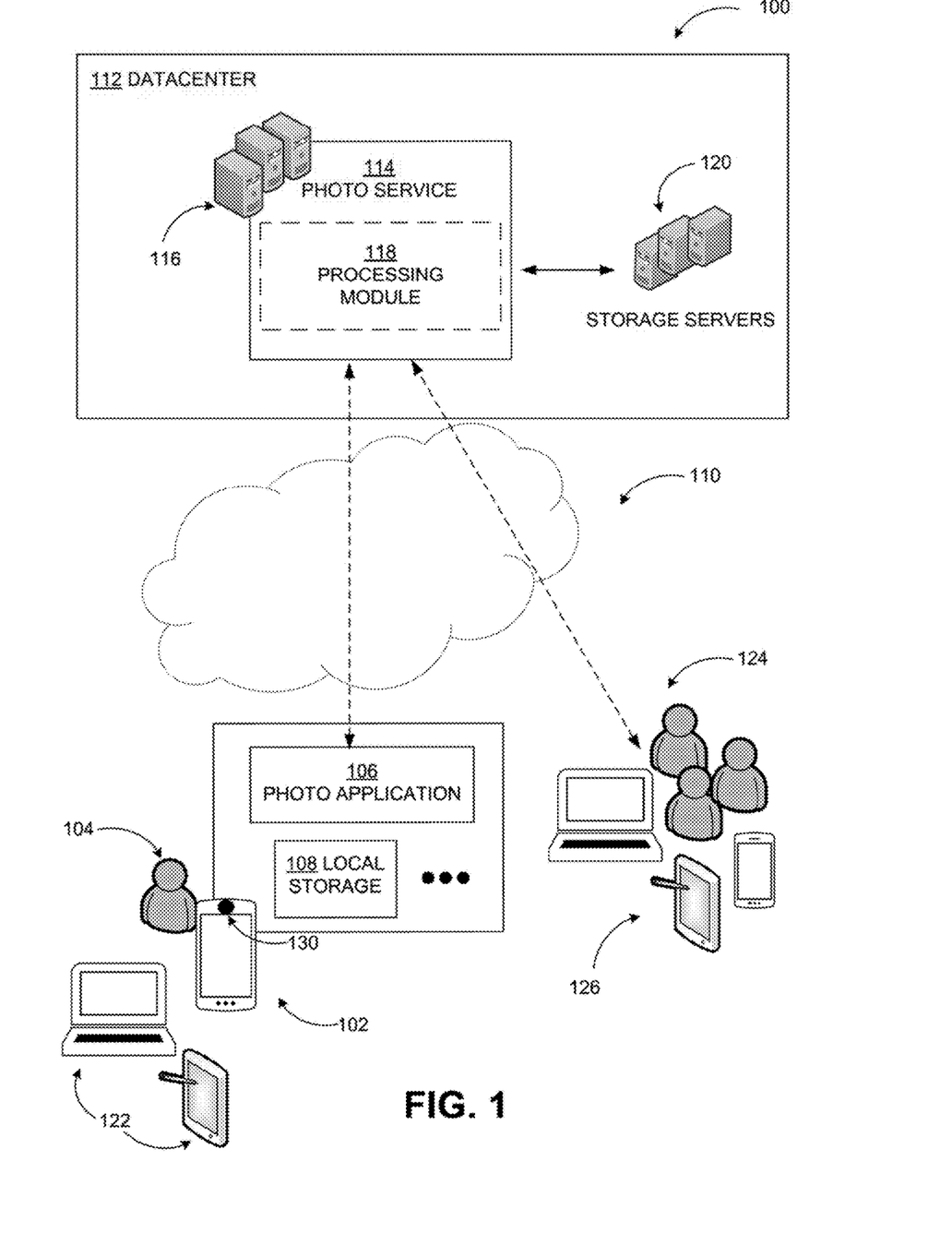
FIG. 1 includes an example network environment where a system for automatically grouping based handling of similar photos may be implemented.

FIG. 1 includes an example network environment where a system for automatic grouping based handling of similar photos may be implemented.

As illustrated in diagram 100, an example system may include a datacenter 112 hosting a cloud-based photo service 114 configured to provide storage for, enable sharing of, and process photos that may be captured by and accessed across multiple devices and users. The datacenter 112 may include one or more processing servers 116 configured to execute the photo service 114, among other components. In some embodiments, at least one of the processing servers 116 may be operable to execute a processing module 118 of the photo service 114, where the processing module 118 may be integrated with the photo service 114. The datacenter 112 may also include one or more storage servers 120 configured to manage one or more data stores comprising data associated with photos retained by the photo service 114 and/or processing module 118. As described herein, the photo service 114 and/or processing module 118 may be implemented as software, hardware, or combinations thereof.

In some embodiments, the photo service 114 may be configured to interoperate with various applications to process photos captured locally on user associated devices. For example, as illustrated in the diagram 100, a user 104 may execute a thin (e.g., a web browser) or a thick (e.g., a locally installed client application) version of an application 106 through the device 102 with which the photo service 114 may be configured to integrate and interoperate with over one or more networks, such as network 110. The application 106 may be an application hosted by the photo service, such as a photo client, for example. The device 102 may include a desktop computer, a laptop computer, a tablet computer, a vehicle mount computer, a smart phone, or a wearable computing device, among other similar devices. A communication interface may facilitate communication between the photo service 114 and the application 106 over the network 110.

In an example embodiment, the photo service 114 may be configured to receive photos stored on local storage 108 of the device 102. The received photos may be stored remotely at the photo service 114 within the storage servers 120, for example. Similar photos may be grouped as a group of people or person's image taken within a short time frame. Grouping of the photos may be based on a difference metric comparing facial features, background composition, and color composition. Among the group of photos, a representative image may be selected based on a quality threshold and displayed representing the entire group. Visual aids such as icons, text, and other elements may be used to indicate information associated with the grouped photos. Context based menus may be presented to allow users to select and handle the entire group or photos within the group seamlessly as the user handles other images within a photo viewing/handling user interface. In one embodiment, configuration and/or processing options may be provided to the user 104 through a user experience of the application 106 to enable selection and handling of captured photos (see FIGS. 4, 5).

Some of the actions and/or processes described herein have been illustrated from the perspective of a server (for example, the processing servers 116 configured to execute the photo service), however the same actions may be performed similarly by a client (for example, the application 106), among other entities. Additionally, some of the actions and/or processes described herein have been illustrated from the perspective of the client, however the same actions may be performed similarly by the server.

Technical advantages of a system according to embodiments may include enhanced user interaction in processing and viewing captured images, reduced bandwidth in sharing and storing grouped photos, and reduced processing resource usage by allowing context based actions to be performed on individual photos or groups instead of having a user to deal with a large number of similar photos.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with large numbers of devices and users storing and/or sharing content both locally at client devices and remotely at cloud-based storage services.

Figure 2:
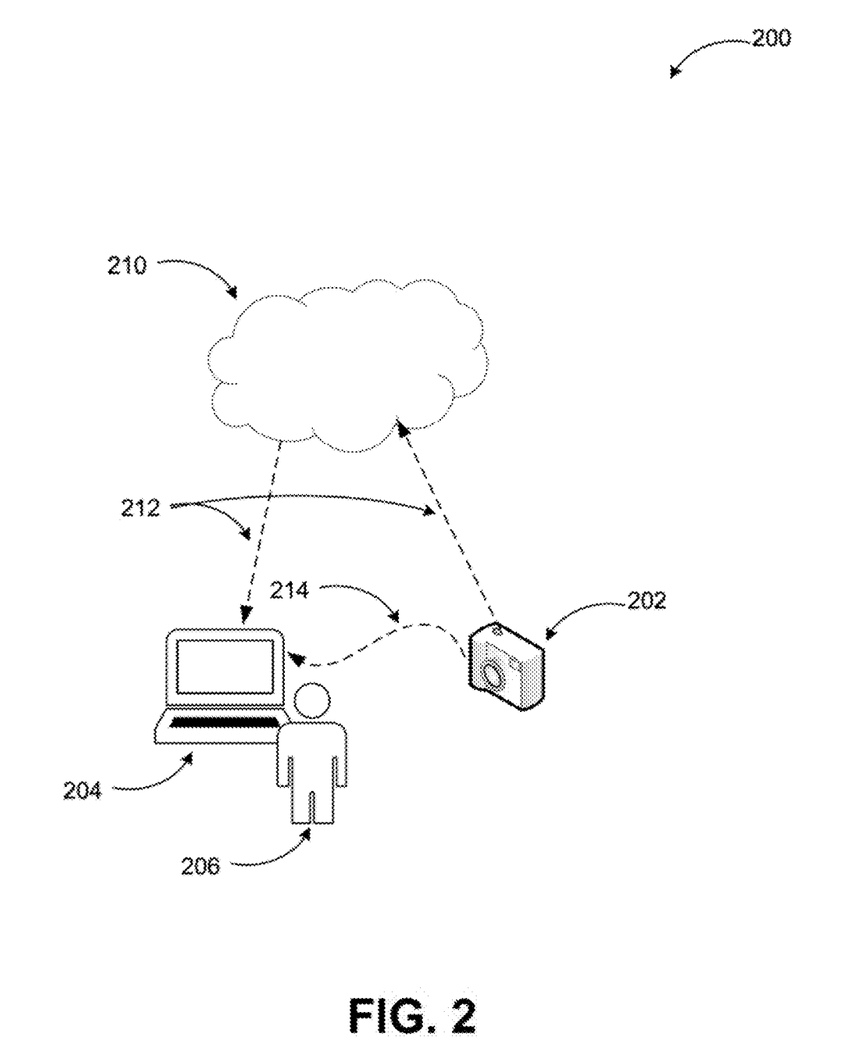
FIG. 2 includes a conceptual diagram illustrating an example system of two distinct devices for automatic grouping based handling of similar photos.

FIG. 2 includes a conceptual diagram illustrating an example system of two distinct devices for automatic grouping based handling of similar photos.

As shown in a diagram 200, a user 206 may capture images using a camera 202. The images may be transmitted to a computing device 204 directly (214) (e.g., via wired or wireless communication such as Bluetooth, infrared, or similar communication techniques) or over one or more networks 210 (network communication 212). Thus, the user 206 may view and process the captured images on the camera 202 or at the computing device 204, for example, using a photo processing application.

In some embodiments, photos may be grouped as discussed above and transmission to the computing device may be based on the type of connection. For example, if a broadband communication channel is available, all photos in a group may be transmitted, whereas if the communication bandwidth is limited or metered (e.g., cellular), only the representative photo may be transmitted. Thus, in some cases, some processing may be performed at the camera 202 and other processing may be performed at the computing device 204.

In one example embodiment, the representative photo (e.g., best quality) may be transmitted to the computing device initially. If the user indicates they want to perform an action on one or more individual photos of the group, the rest of the images from the group may be transmitted to the computing device 204. Similar approaches may be implemented when the user shares grouped photos with other users.

Figure 3:
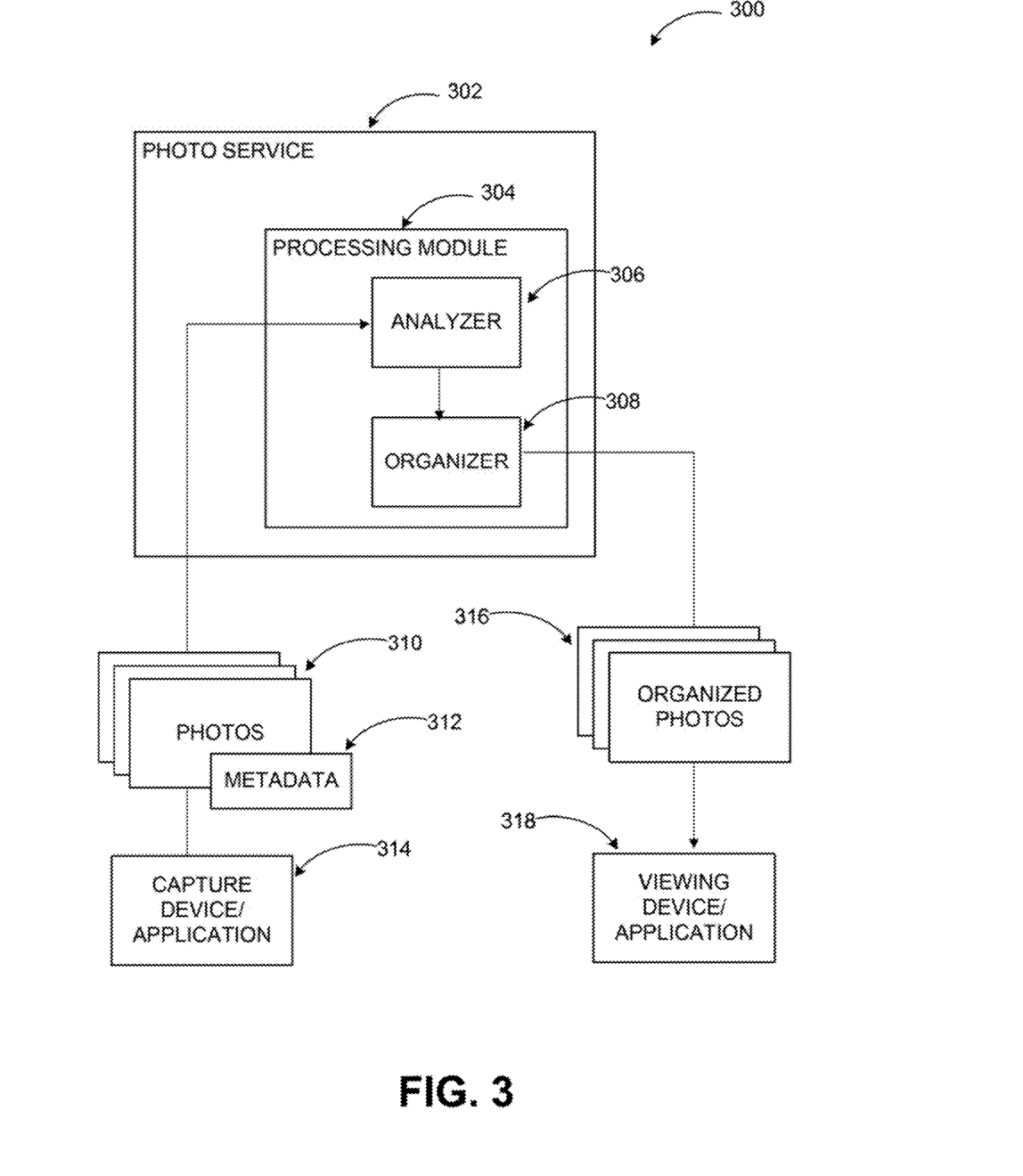
FIG. 3 includes an example photo service for automatic grouping based handling of similar photos.

FIG. 3 includes an example photo service for automatic grouping based handling of similar photos.

As shown in diagram 300, photos 310 along with their respective metadata 312 such as time of capture, size, location, mode of capture (e.g., burst mode, individual mode) may be captured by a capture device and/or application 314 and provided to a photo service 302. The photo service 302 may include a processing module 304, which in turn may include an analyzer engine 306 and an organizer engine 308. Organized photos 316 may be provided to a viewing device or application 318 by the photo service 302.

The photo service 302 and/or the capture device and/or application 314 may use facial recognition/analysis, time of capture, location of capture, and/or color/background composition to determine grouping. Images taken within a short time frame of the same person or persons at the same location may be grouped together as a stack. Thus, a relatively large number of photos may be captured and a best quality image designated as representative. A user may then share/store the entire group, the representative, or a subset of the group. The viewing device or application 318 may display the stack as a single entity avoiding clutter and confusion in viewing or handling the photos along with others that may already be stored.

The "near-duplicate" images are typically taken where the user's intent may be to capture a single, high quality image but instead may have taken multiple photos to insure that at least one is not blurry or all subjects are looking their best. Instead of having to remember to turn on a special mode, the user may shoot just the way he/she is used to, and let the photo service 302 to recognize the bursts automatically, electing a representative shot, for example, with open eyes and smiling faces as the "top" image to display in the grid views. Thus, in capturing the photos, the user may not have to switch to a "burst" or "group" mode. They may take photos as they are accustomed to, and the photos may be grouped automatically after the capture.

Figure 4:
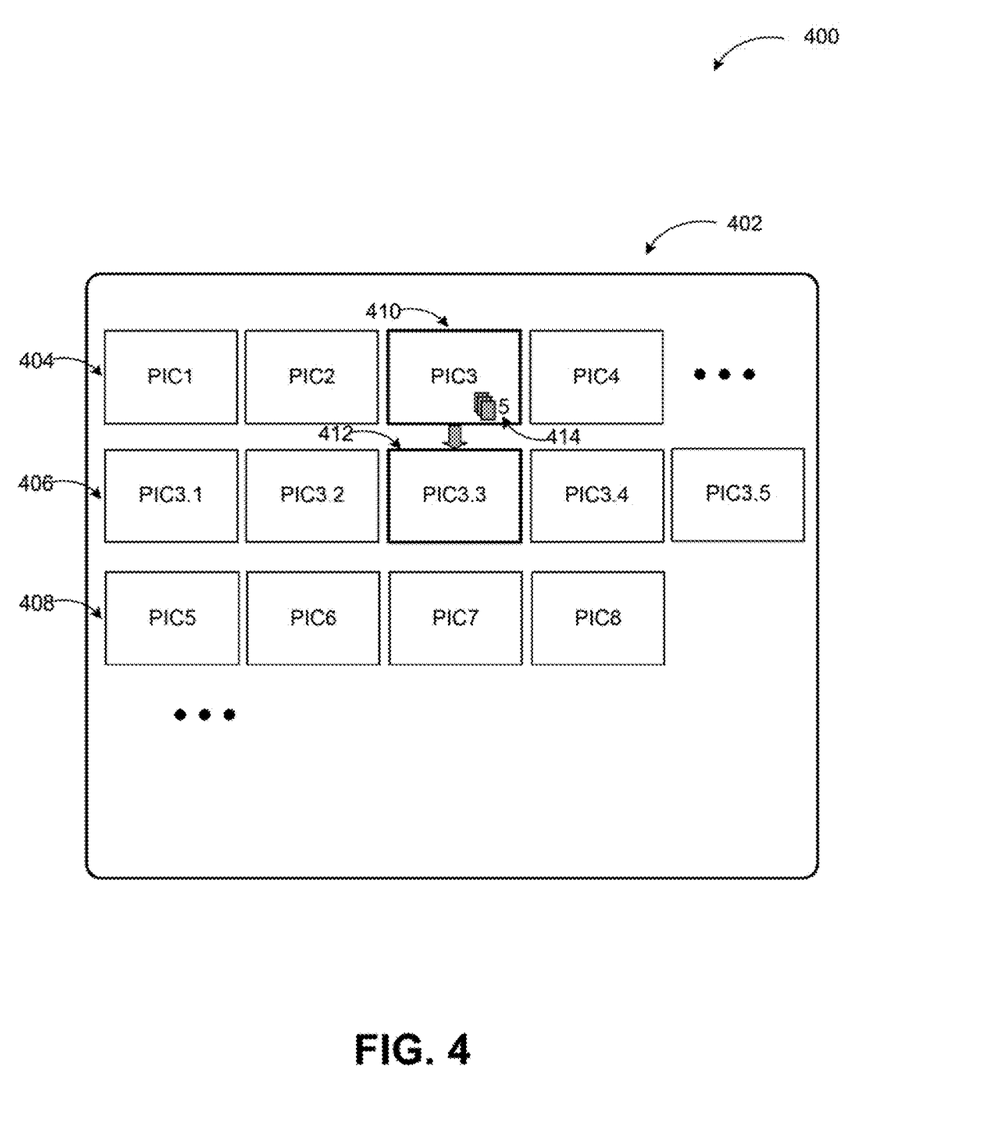
FIG. 4 includes an example user interface associated with automatic grouping based handling of similar photos.

FIG. 4 includes an example user interface associated with automatic grouping based handling of similar photos.

As shown in the user interface 402 of diagram 400, grouped or stacked photos may be presented in a photo viewing mode in a collapsed manner to avoid cluttering the user interface with a large number of similar photos. A representative photo 410 (top photo) may be displayed along with other (not belonging to the group) photos 404. Further unrelated photos 408 may also be displayed in rows, for example, in a grid view. The group may be indicated through visual indicators 414 such as icons, text, and other elements (e.g., highlighting or similar graphical scheme on the representative photo 410). Upon an action on the representative photo 410 such as a tap or similar selection action, the group may be expanded. For example, the photos 406 in the group may be displayed in an additional row by pushing the further unrelated photos 408 down. Among the photos 406 of the group, the representative photo 412 may be displayed directly under the group placeholder thumbnail (representative photo 410). In another example, the group may open with the representative photo centered in a mobile user interface.

When iterating, both the group affordance and group strip may pan with the flip view item. Once an open group is fully out of view, the group should close back (collapse) automatically to only display the representative photo again. The photo viewer may be configured to also rotate into landscape mode. Like in portrait mode, application bar buttons (command objects) may swap from the general photo commands to the group specific ones after iteration completes. Thus, the user interface may switch between a group command bar displaying commands related to operations on the group and a photo viewing command bar displaying generic photo viewing commands depending on which group mode (collapsed or expanded) is on.

A photo similarity determination that uses a difference metric based on, for example, summing the red-blue-green (RGB) channels for each pixel of an image and comparing it with another image via Root Mean Square (the value may be normalized, for example, from 0.0-1.0 and used as a difference metric). The threshold for including a photo in a group or stack may be based on tuning for high precision from user data. For group shots, photos may be detected where the people in the photo are smiling and have open eyes, for example.

The photo capture device, a digital camera or a smart phone camera, may capture photos in an automatic or manual group capture mode, where pressing a button once may result in a predefined number of photos being captured of the same scene. In other examples, the user may be enabled to press the button and photos may be captured as long as the user keeps the button pressed. In either case, the photos may be grouped, a representative photo selected, and group processing capabilities discussed herein may be provided automatically to the captured photos such that the user does not have to identify manually photos to be grouped.

Figure 5:
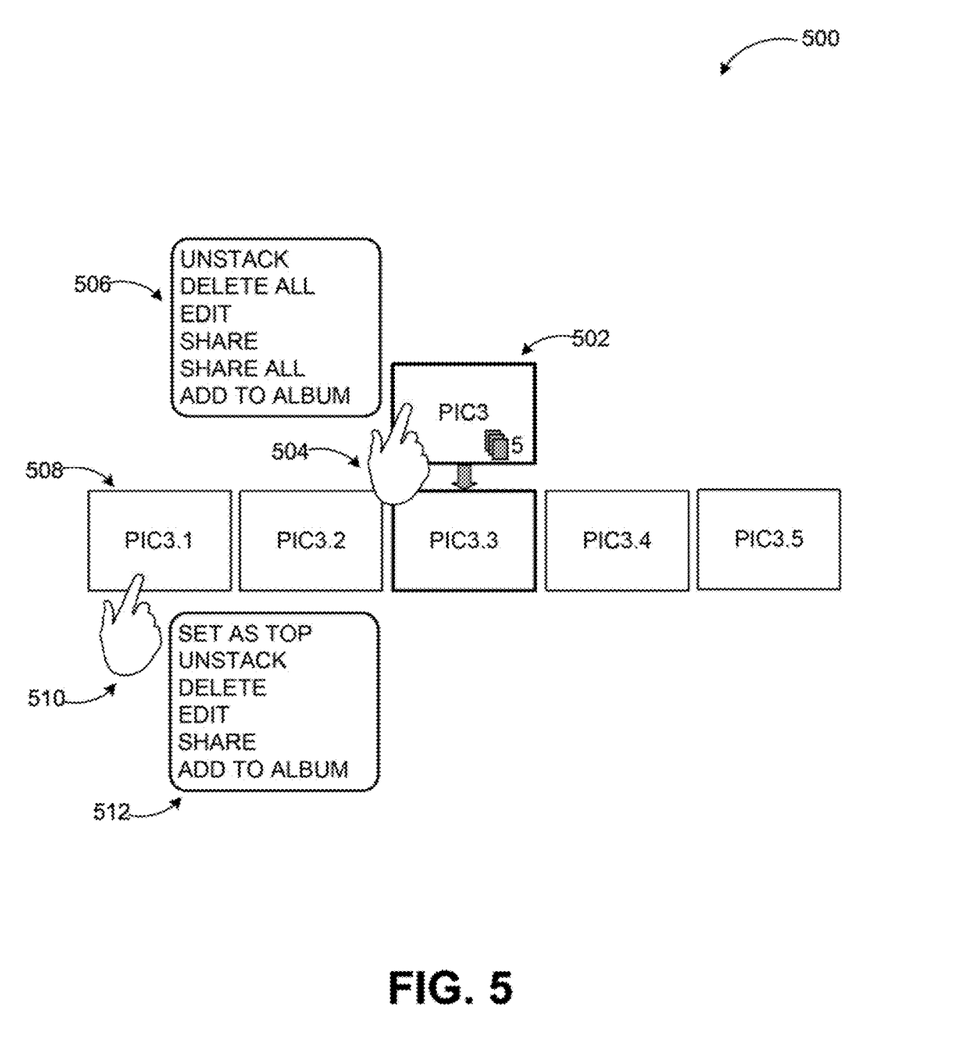
FIG. 5 includes another example user interface associated with automatic grouping based handling of similar photos.

FIG. 5 includes another example user interface associated with automatic grouping based handling of similar photos.

As shown in diagram 500, context based command menus may be provided depending on which group mode (collapsed or expanded) is selected. The available commands may be provided in a command bar at a fixed location on the user interface or as dynamically located pop-up menus. In the example illustration, the pop-up menu 506 may include group-specific commands such as unstack (dissolve the group into individual photos), delete all, edit (group), share (representative photo), share all, or add to album. The pop-up menu 506 may be displayed upon selection 504 or indication of interest (e.g., hovering on) the collapsed group item (thumbnail 502 of representative photo).

In some embodiments, the user may be enabled to share the entire group, the representative photo, or selected photos in the group. In some applications, users may be allowed to assign selected photos to albums and view/store/share the albums. Similar to sharing the entire group, the representative photo, or selected photos in the group may be assigned to an album with a default behavior of the representative photo being assigned to save storage space and network usage. If the representative photo or a selected photo in the group is assigned to an album and changes are made to the group (e.g., representative photo changed or deleted), the photo assigned to the album may be automatically changed too.

In another scenario, the pop-up menu 512 may include photo-specific commands such as set as top (representative photo), unstack (dissolve the group into individual photos), delete selected photo, edit (selected photo), share (selected photo), or add to album. The pop-up menu 512 may be displayed upon selection 510 or indication of interest (e.g., hovering on) the expanded group item (thumbnail 508 of selected photo). The commands, menus, and behavior illustrated and discussed in conjunction with FIG. 5 are for illustration purposes only and do not constitute a limitation on embodiments. Other commands, menus, and behavior may be implemented using the principles discussed herein.

The examples provided in FIGS. 1 through 5 are illustrated with specific systems, services, applications, modules, and notifications. Embodiments are not limited to environments according to these examples. Automatic grouping based handling of similar photos may be implemented in environments employing fewer or additional systems, services, applications, engines, and user experience configurations. Furthermore, the example systems, services, applications, modules, and notifications shown in FIG. 1 through 5 may be implemented in a similar manner with other values using the principles described herein.

Figure 6:
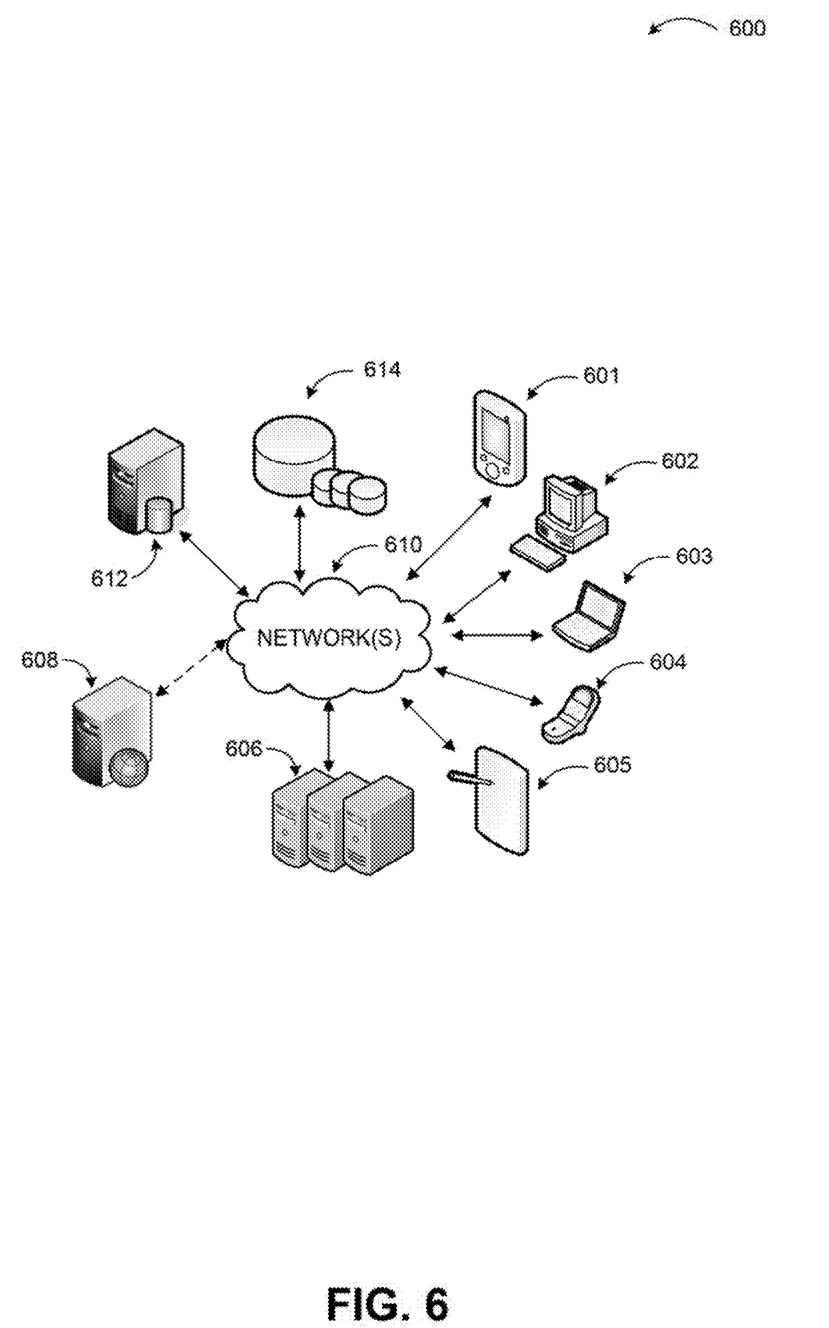
FIG. 6 is a networked environment, where a system according to embodiments may be implemented.

FIG. 6 is a networked environment, where a system according to embodiments may be implemented. In addition to locally installed applications (for example, photo application 106), a processing module 118 may also be employed in conjunction with hosted applications and services (for example, a photo service 114) that may be implemented via software executed over one or more servers 606 or individual server 608, as illustrated in diagram 600. A hosted service or application may communicate with client applications on individual computing devices such as a handheld computer 601, a desktop computer 602, a laptop computer 603, a smart phone 604, a tablet computer (or slate), 605 ('client devices') through network(s) 610 and control a user interface presented to users.

Client devices 601-605 are used to access the functionality provided by the hosted service or application. One or more of the servers 606 or server 608 may be used to provide a variety of services as discussed above. Relevant data may be stored in one or more data stores (e.g. data store 614), which may be managed by any one of the servers 606 or by database server 612.

Network(s) 610 may comprise any topology of servers, clients, Internet service providers, and communication media. A system according to embodiments may have a static or dynamic topology. Network(s) 610 may include a secure network such as an enterprise network, an unsecure network such as a wireless open network, or the Internet. Network(s) 610 may also coordinate communication over other networks such as PSTN or cellular networks. Network(s) 610 provides communication between the nodes described herein. By way of example, and not limitation, network(s) 610 may include wireless media such as acoustic, RF, infrared and other wireless media.

Many other configurations of computing devices, applications, engines, data sources, and data distribution systems may be employed for automatic grouping based handling of similar photos. Furthermore, the networked environments discussed in FIG. 6 are for illustration purposes only. Embodiments are not limited to the example applications, engines, or processes.

Figure 7:
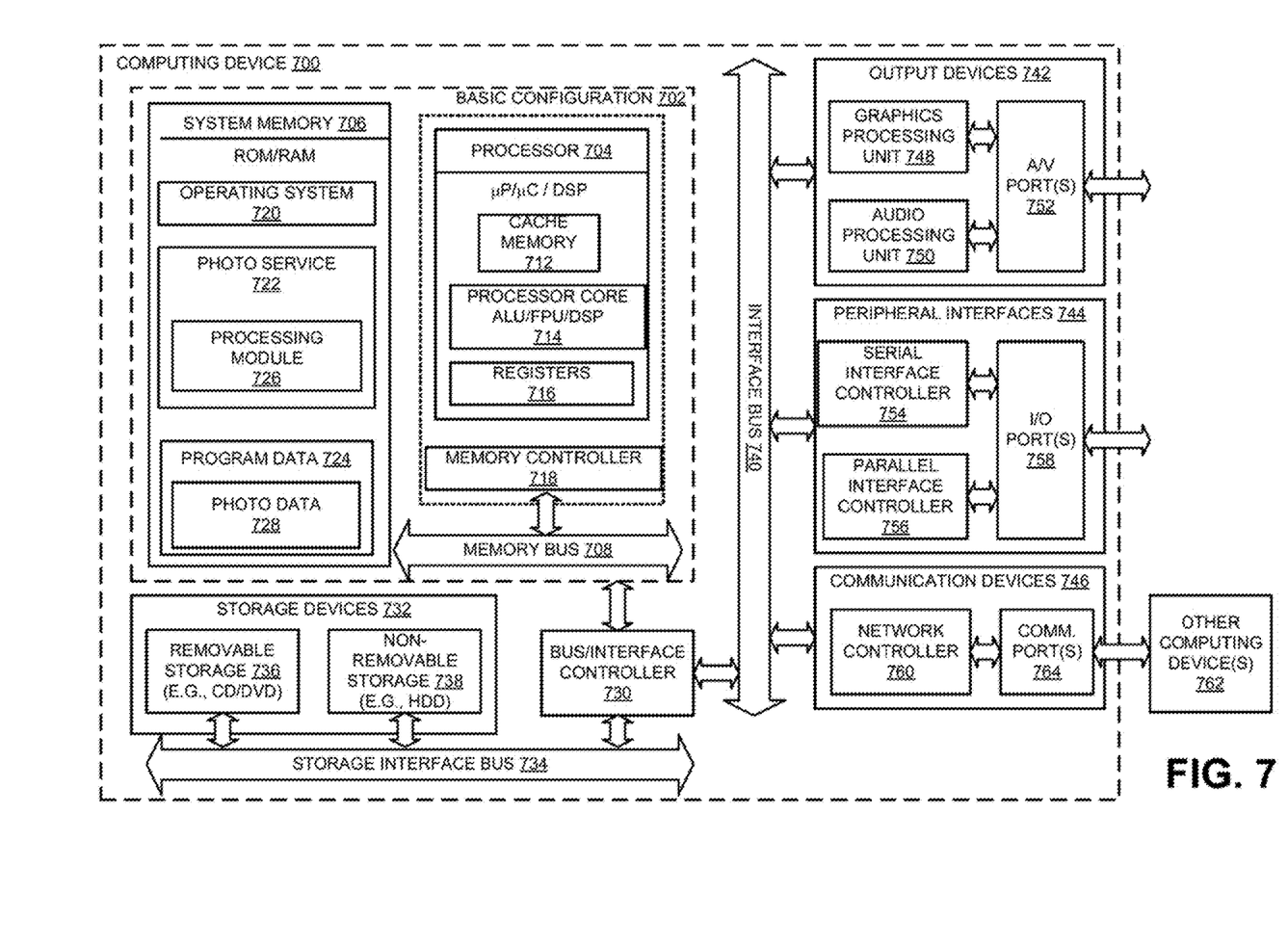
FIG. 7 is a block diagram of an example general purpose computing device, which may be used for automatic grouping based handling of similar photos.

FIG. 7 is a block diagram of an example general purpose computing device, which may be used for automatic grouping based handling of similar photos.

For example, computing device 700 may be used as a server, desktop computer, portable computer, smart phone, special purpose computer, or similar device. In an example basic configuration 702, the computing device 700 may include one or more processors 704 and a system memory 706. A memory bus 708 may be used for communicating between the processor 704 and the system memory 706. The basic configuration 702 is illustrated in FIG. 7 by those components within the inner dashed line.

Depending on the desired configuration, the processor 704 may be of any type, including but not limited to a microprocessor (µP), a microcontroller (µC), a digital signal processor (DSP), or any combination thereof. The processor 704 may include one more levels of caching, such as a level cache memory 712, one or more processor cores 714, and registers 716. The example processor cores 714 may (each) include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, a photo service 722, and program data 724. The photo service 722 may include a processing module 726, which may be an integrated module of the photo service 722. The photo service 722 and/or processing module 726 may be configured to receive, at the photo service 722, captured photos, group the photos automatically, select a representative photo, and provide handling/viewing features based on the grouping. The program data 724 may include, among other data, photo data 728, as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example communication device 746 includes a network controller 760, which may be arranged to facilitate communications with one or more other computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

Example embodiments may also include methods for automatic grouping based handling of similar photos. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 8:
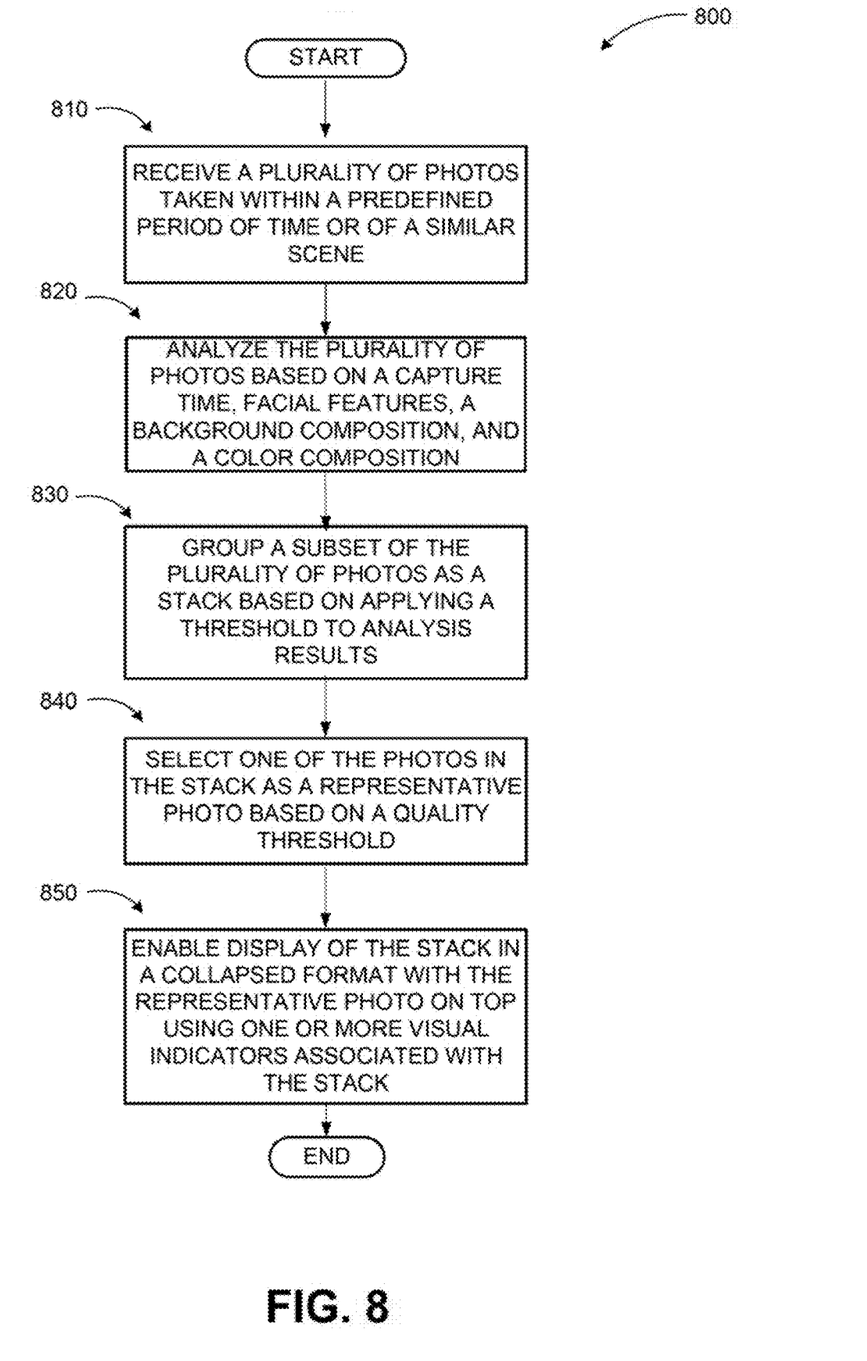
FIG. 8 illustrates a logic flow diagram of a method for automatic grouping based handling of similar photos.

FIG. 8 illustrates a logic flow diagram of a method for automatic grouping based handling of similar photos, according to embodiments.

Process 800 may be implemented on a computing device, server, or other system. An example system may include a server comprising a communication interface to facilitate communication between a storage service and one or more devices, a memory, and one or more processors. The processors may be configured to, in conjunction with the memory, execute a photo service provided to enable automatic grouping based handling of similar photos.

Process 800 begins with operation 810, where a plurality of photos taken within a predefined period of time or of a similar scene may be received at a photo service. The photo service may analyze the plurality of photos based on a capture time, facial features, a background composition, and a color composition at operation 820. At operation 830, a subset of the plurality of photos may be grouped as a stack based on applying a threshold to analysis results.

At operation 840, the photo service may select one of the photos in the stack as a representative photo based on a quality threshold, and provide the stack to be displayed at operation 850 in a collapsed format with the representative photo on top using one or more visual indicators associated with the stack.

The operations included in process 800 are for illustration purposes Automatic grouping based handling of similar photos may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some examples, a method to provide automatic grouping based handling of similar photos is described. The method may include receiving a plurality of photos taken within a predefined period of time or of a similar scene; analyzing the plurality of photos based on a capture time, facial features, a background composition, and a color composition; grouping a subset of the plurality of photos as a stack based on applying a threshold to analysis results; selecting one of the photos in the stack as a representative photo based on a quality threshold; and enabling display of the stack in a collapsed format with the representative photo on top using one or more visual indicators associated with the stack.

According to some examples, a means for providing automatic grouping based handling of similar photos is described. The means may include a means for receiving a plurality of photos taken within a predefined period of time or of a similar scene; a means for analyzing the plurality of photos based on a capture time, facial features, a background composition, and a color composition; a means for grouping a subset of the plurality of photos as a stack based on applying a threshold to analysis results; a means for selecting one of the photos in the stack as a representative photo based on a quality threshold; and a means for enabling display of the stack in a collapsed format with the representative photo on top using one or more visual indicators associated with the stack.

According to other examples, the method may further include enabling display of context based menus of commands associated with group level or individual photo level actions based on a display mode of the stack. The group level actions may include unstack, delete all, edit group, share representative photo, share all, or add group to album. The individual photo level actions may include set a selected photo as the representative photo, remove the selected photo from the stack, delete the selected photo, edit the selected photo, share the selected photo, or add the selected photo to album. The method may also include enabling the display of the context based menus of commands as one of a fixed user interface command bar and a dynamically located pop-up menu.

According to further examples, the visual indicators may include one or more of textual, graphic, coloring, shading, and highlighting indicators. The method may also include indicating a number of photos in the stack through the visual indicators and/or indicating a thumbnail of the representative photo as representing the stack through the visual indicators. The method may yet include determining a person of interest within a group of people in the plurality of photos; and analyzing the facial features of the person of interest for grouping purposes. The method may also include determining a group of people in the plurality of photos; analyzing the facial features of every person in the group of people; and averaging values assigned to analysis results of the facial features.

According to other examples, a server to execute a photo service configured to provide automatic grouping based handling of similar photos is described. The server may include a communication interface configured to facilitate communication between the photo service and a first device; a memory configured to store instructions; and one or more processors coupled to the memory. The one or more processors, in conjunction with the instructions stored in the memory, may be configured to receive a plurality of photos from the first device taken within a predefined period of time or of a similar scene; analyze the plurality of photos based on a capture time, facial features, a background composition, and a color composition; group a subset of the plurality of photos as a stack based on applying a threshold to analysis results; select one of the photos in the stack as a representative photo based on a quality threshold; and provide the stack to be displayed to one of the first device and a second device in a collapsed format with the representative photo on top using one or more visual indicators associated with the stack.

According to some examples, the one or more processors may be further configured to enable display of the stack on one of the first device and the second device as a single photo among other photos with at least one visual indicator indicating the single photo as representing the stack. The single photo may be a thumbnail of the representative photo. The one or more processors may also be configured to enable expansion of the stack to display the subset of the plurality of photos by creating space among the other photos on one of the first device and the second device. The first device may be a digital camera and the second device may be one of a handheld, desktop, laptop, and wearable computing device. The first device and the second device may be a same computing device.

According to further examples, a computer readable memory device with instructions stored thereon to provide automatic grouping based handling of similar photos is described. The instructions may include receiving a plurality of photos taken within a predefined period of time or of a similar scene; analyzing the plurality of photos based on a capture time, facial features, a background composition, and a color composition; grouping a subset of the plurality of photos as a stack based on applying a difference threshold to analysis results; selecting one of the photos in the stack as a representative photo based on a quality threshold; and enabling display of the stack in a collapsed format with the representative photo on top using one or more visual indicators associated with the stack, where the visual indicators include one or more of textual, graphic, coloring, shading, and highlighting indicators configured to indicate one or more of a thumbnail of the representative photo as representing the stack and a number of photos in the stack.

According to other examples, the instructions may further include determining a difference metric based on analysis of the capture time, the facial features, the background composition, and the color composition; and comparing the metric to the difference threshold. The instructions may also include selecting the representative photo based on comparing a quality metric derived from an analysis of the facial features, the background composition, and the color composition of the subset of the plurality of photos; and storing a difference metric and a quality metric as metadata with the stack.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to provide automatic grouping based handling of similar photos, the method comprising:
receiving a plurality of photos taken within a predefined period of time or of a similar scene;
analyzing the plurality of photos based on a capture time, facial features, a background composition, and a color composition;
grouping a subset of the plurality of photos as a stack based on analysis results;
selecting one of the photos in the stack as a representative photo based on a quality threshold;
displaying the stack in a collapsed format with the representative photo on top using one or more visual indicators associated with the stack;
creating an album from the stack based on an assignment of the stack to the album by a user;
in response to receiving a request to share the album with another user, transmitting the representative photo to share the album; and
in response to detecting intent of the other user to perform an action on more than the representative photo, transmitting remaining photos of the stack.

2. The method of claim 1, further comprising:
displaying context based menus of commands associated with group level or individual photo level actions based on a display mode of the stack.

3. The method of claim 2, wherein the group level actions include unstack, delete all, edit group, share representative photo, share all, or add group to album.

4. The method of claim 2, wherein the individual photo level actions include set a selected photo as the representative photo, remove the selected photo from the stack, delete the selected photo, edit the selected photo, share the selected photo, or add the selected photo to album.

5. The method of claim 2, further comprising:
enabling the display of the context based menus of commands as one of a fixed user interface command bar and a dynamically located pop-up menu.

6. The method of claim 1, wherein the visual indicators include one or more of textual, graphic, coloring, shading, and highlighting indicators.

7. The method of claim 1, further comprising:
indicating a number of photos in the stack through the visual indicators.

8. The method of claim 1, further comprising:
indicating a thumbnail of the representative photo as representing the stack through the visual indicators.

9. The method of claim 1, further comprising:
determining a person of interest within a group of people in the plurality of photos; and
analyzing the facial features of the person of interest for grouping purposes.

10. The method of claim 1, further comprising:
determining a group of people in the plurality of photos;
analyzing the facial features of every person in the group of people; and
averaging values assigned to analysis results of the facial features.

11. A server to execute a photo service configured to provide automatic grouping based handling of similar photos, the server comprising:
a communication interface configured to facilitate communication between the photo service and a first device;
a memory configured to store instructions; and
one or more processors coupled to the memory, the one or more processors, in conjunction with the instructions stored in the memory, are configured to:

receive a plurality of photos from the first device taken within a predefined period of time or of a similar scene;

analyze the plurality of photos based on a capture time, facial features, a background composition, and a color composition;

group a subset of the plurality of photos as a stack based on analysis results;

select one of the photos in the stack as a representative photo based on a quality threshold;

provide the stack to be displayed to one of the first device and a second device in a collapsed format with the representative photo on top using one or more visual indicators associated with the stack;

create an album from the stack based on an assignment of the stack to the album by a user;

in response to receiving a request to share the album with another user, transmit the representative photo to share the album; and in response to detecting an intent of the other user to perform an action on more than the representative photo, transmit the remaining photos of the stack.

12. The server of claim 11, wherein the one or more processors are further configured to:

display the stack on one of the first device and the second device as a single photo among other photos with at least one visual indicator indicating the single photo as representing the stack.

13. The server of claim 12, wherein the single photo is a thumbnail of the representative photo.

14. The server of claim 12, wherein the one or more processors are further configured to:

enable expansion of the stack to display the subset of the plurality of photos by creating space among the other photos on one of the first device and the second device.

15. The server of claim 11, wherein the first device is a digital camera and the second device is one of a handheld, desktop, laptop, and wearable computing device.

16. The server of claim 11, wherein the first device and the second device are a same computing device.

17. A computer readable memory device with instructions stored thereon to provide automatic grouping based handling of similar photos, the instructions comprising:

receiving a plurality of photos taken within a predefined period of time or of a similar scene;

analyzing the plurality of photos based on a capture time, facial features, a background composition, and a color composition;

grouping a subset of the plurality of photos as a stack based on analysis results;

selecting one of the photos in the stack as a representative photo based on a quality threshold;

displaying the stack in a collapsed format with the representative photo on top using one or more visual indicators associated with the stack, wherein the visual indicators include one or more of textual, graphic, coloring, shading, and highlighting indicators configured to indicate one or more of a thumbnail of the representative photo as representing the stack and a number of photos in the stack;

creating an album from the stack based on an assignment of the stack to the album by a user;

in response to receiving a request to share the album with another user, transmitting the representative photo to share the album; and in response to detecting intent of the other user to perform an action on more than the representative photo, transmitting remaining photos of the stack.

18. The computer readable memory device of claim 17, wherein the instructions further comprise:

determining a difference metric based on analysis of the capture time, the facial features, the background composition, and the color composition; and comparing the metric to the difference threshold.

19. The computer readable memory device of claim 17, wherein the instructions further comprise:

selecting the representative photo based on comparing a quality metric derived from an analysis of the facial features, the background composition, and the color composition of the subset of the plurality of photos.

20. The computer readable memory device of claim 17, wherein the instructions further comprise:

storing a difference metric and a quality metric as metadata with the stack.

* * * * *